United States Patent [19]

Hanway, Jr. et al.

[11] 4,113,840

[45] Sep. 12, 1978

[54] PROCESS FOR THE REMOVAL OF SULFUR DIOXIDE FROM EXHAUST FLUE GASES

[75] Inventors: John E. Hanway, Jr., Naperville, Ill.; Richard G. Mumford, San Francisco, Calif.

[73] Assignee: Beamer/Wilkinson & Associates, Oakland, Calif.

[21] Appl. No.: 507,290

[22] Filed: Sep. 19, 1974

[51] Int. Cl.$^2$ .................... C01B 13/00; C01B 17/72
[52] U.S. Cl. ................................. 423/242; 423/522
[58] Field of Search ............... 423/242–244, 423/522, 528, 529, 532, 533; 55/73

[56] References Cited

U.S. PATENT DOCUMENTS

| 2,021,936 | 11/1935 | Johnstone | 423/242 |
|---|---|---|---|
| 2,342,704 | 2/1944 | Striplin | 423/529 |
| 3,745,751 | 7/1973 | Zey et al. | 423/242 |
| 3,766,090 | 10/1973 | Juntgen et al. | 55/73 X |
| 3,775,532 | 11/1973 | Shah | 423/242 |
| 3,808,321 | 4/1974 | Fukji et al. | 423/242 |
| 3,907,970 | 9/1975 | Boering | 423/244 |
| 3,950,493 | 4/1976 | Dorr et al. | 423/242 |

FOREIGN PATENT DOCUMENTS

| 526,170 | 6/1956 | Canada | 423/522 |
|---|---|---|---|
| 1,052,188 | 12/1966 | United Kingdom | 423/522 |

*Primary Examiner*—O. R. Vertiz
*Assistant Examiner*—Gregory A. Heller
*Attorney, Agent, or Firm*—Flehr, Hohbach, Test, Albritton & Herbert

[57] ABSTRACT

Sulfur dioxide is removed from exhaust flue gases continuously by contact with adsorbent, activated carbon, in aqueous slurry form, preferably in a venturi contactor. The carbon with adsorbed sulfur dioxide is partially dewatered and passed to an oxidation zone in which the sulfur dioxide is converted to sulfur trioxide and absorbed into the aqueous phase to form saleable sulfuric acid. The desorbed activated carbon is recycled to the venturi contactor.

16 Claims, 2 Drawing Figures

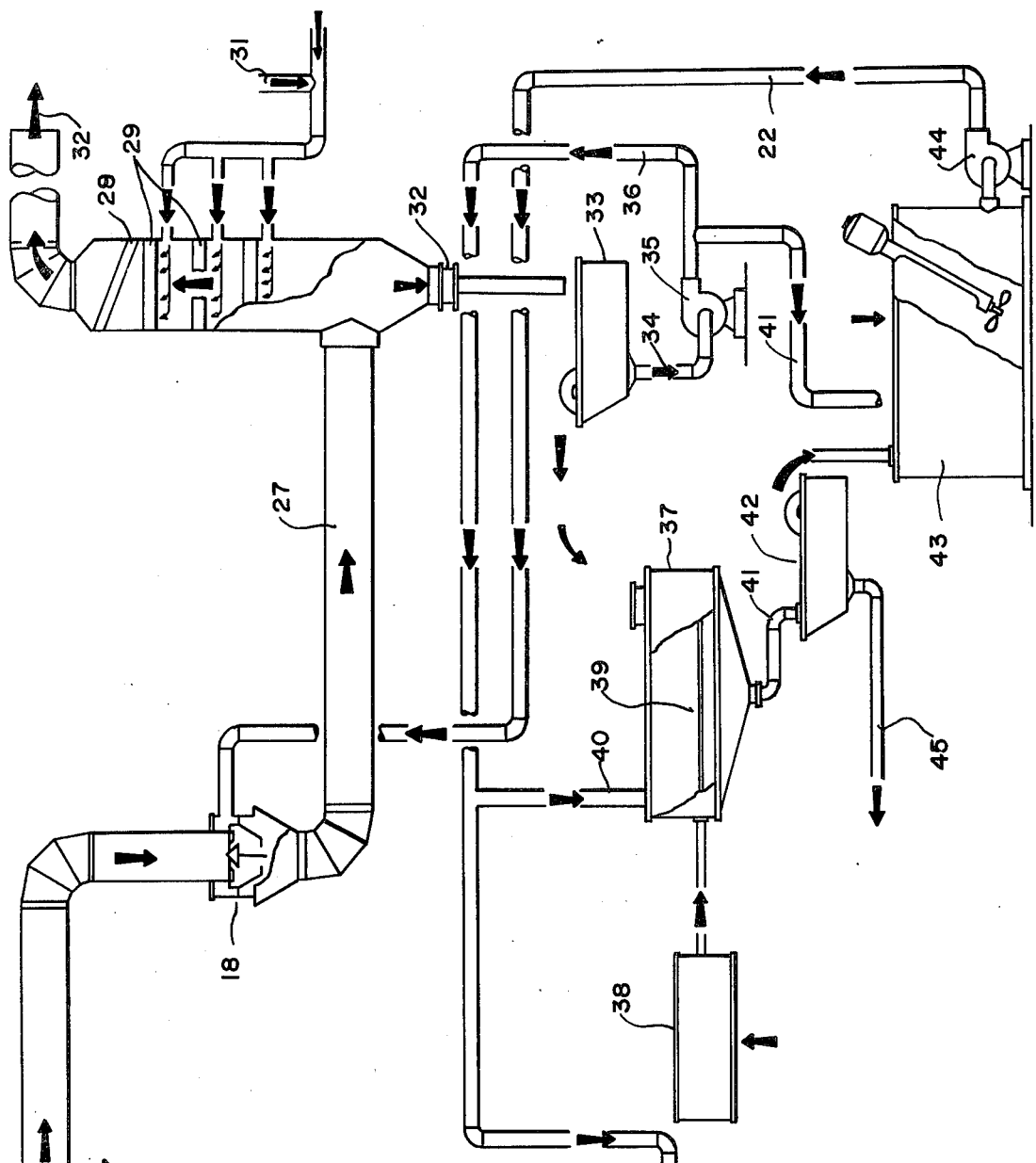
FIG.—1
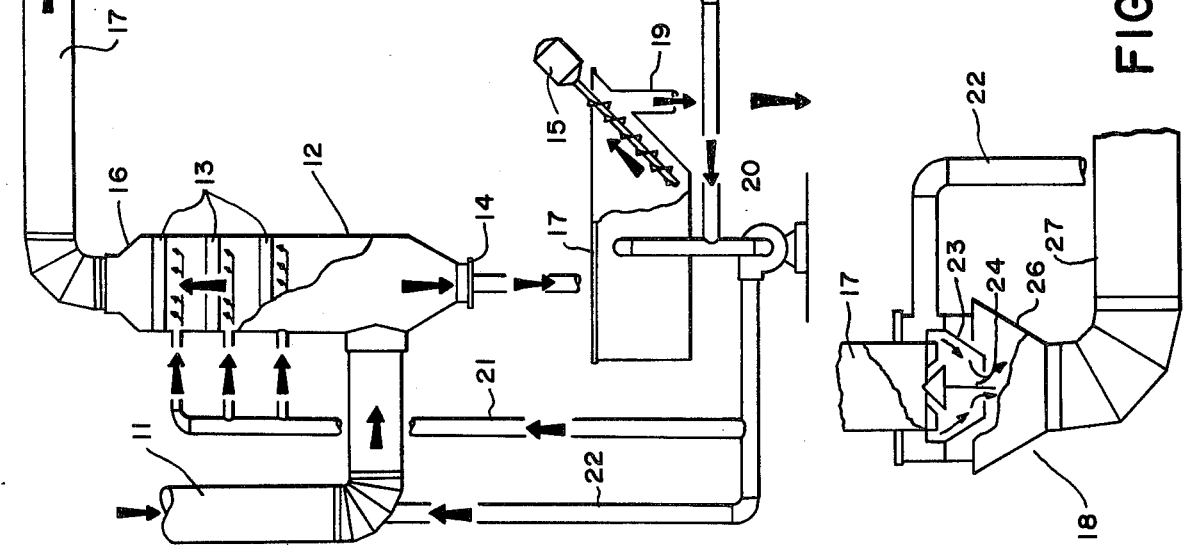
FIG.—2

PROCESS FOR THE REMOVAL OF SULFUR DIOXIDE FROM EXHAUST FLUE GASES

BACKGROUND OF THE INVENTION

The present invention relates to a method for removing sulfur dioxide from exhaust gas using an aqueous slurry of particulate adsorbent, preferably activated carbon.

Most available fossil fuels contain substantial quantities of sulfur. When burned for power generation, space heating, transportation and industrial purposes or the like, such sulfur is oxidized to sulfur dioxide gas and expelled into the atmosphere in an exhaust flue gas. For example, combustion of coal containing about 3.5% sulfur produces an exhaust flue gas containing sulfur dioxide at a concentration on the order of 3000 ppm. Recently, environmental considerations have prompted legislation to limit the maximum amount of sulfur dioxide in exhaust flue gases to an amount on the order of 200 to 500 ppm. This has caused many users of fossil fuels to change from the relatively inexpensive and readily available high-sulfur content fuels to more expensive and scarcer forms of fuel, such as low-sulfur coal, oil and natural gas. Shortages of these alternate fuels require the use of the higher sulfur fuels, particularly coal. Thus, there is a need for economical and effective techniques for removing sulfur dioxide from the exhaust gas burning such sulfur-containing fuels.

A number of processes have been proposed for the removal of sulfur dioxide from flue gases. In one technique, dry limestone is injected into the exhaust gas breeching. Other processes utilize wet scrubbing with alkali or alkaline earth metals. However, the operating costs for these processes are relatively high. Furthermore, they generally produce voluminous quantities of by-product sludge with no commercial value and with disposal presenting a difficult problem. Also, serious operating difficulties are caused by precipitation of solid matter formed by the sulfur removal reactions onto the equipment.

One theoretical approach has been suggested in the AICHE Symposium Series, No. 134, Vol. 69, pages 71–75, by J. T. Seburn and A. J. Engel entitled "Sorption of Sulfur Dioxide by Suspension of Activated Carbon in Water." This article suggests that gas mixtures containing sulfur dioxide may be bubbled through suspensions of activated carbon in water in a strictly batch operation. It further suggests that the sulfur dioxide can be converted to sulfur trioxide on the carbon surface if the slurry is exposed to oxygen. However, there is no disclosure of converting this simple laboratory experiment to a continuous operation in which the activated carbon is recycled in a closed loop in the system. Also, it is apparent that the system of sparging the gas would cause too much of a pressure drop to be practical for the massive volumes of flue gas emitted from a power plant or the like. Furthermore, there is no practical disclosure of a technique for forming sulfuric acid at sufficient concentrations to be marketable.

SUMMARY OF THE INVENTION AND OBJECTS

It is a general object of the present invention to provide a process for the removal of sulfur dioxide from exhaust flue gases containing the same in an economical and efficient manner.

It is a further object of the invention to provide a system of the above type in which sulfuric acid is produced at a sufficiently high concentration for resale.

It is a particular object of the invention to provide a system of the foregoing type which uses a recycling adsorbent slurry which avoids scaling problems.

In accordance with the above objects, a method for removing sulfur dioxide from exhaust gas is provided in which the exhaust gas is first contacted with an aqueous slurry of a particulate adsorbent, preferably activated carbon, in a slurry contacting zone wherein the sulfur dioxide is adsorbed onto the carbon. Then, the sulfur dioxide-adsorbed carbon slurry is conveyed to an oxidation zone wherein it is converted to sulfur trioxide and desorbed to form sulfuric acid. It is preferable to dewater or concentrate the slurry before this step to form a sulfuric acid solution of high concentration (e.g., 10 to 35% by weight) for maximum resale value. The desorbed adsorbent slurry from the oxidation zone is then recycled to the contacting zone.

To avoid excessive pressure drops, it is preferable that the slurry contacting zone be of the venturi type in which the slurry velocity is increased to a sufficient extent to break up the liquid portion of the slurry into fine droplets to promote intimate contact between the carbon and exhaust gas but insufficient to create a pressure drop greater than about 10 inches of water.

Further objects and features of the present invention will be apparent from the following description taken in conjunction with the accompanying drawing.

BRIEF DESCRIPTION OF THE DRAWING

FIG. 1 is a schematic view of apparatus suitable for carrying out the present process.

FIG. 2 is an expanded view of the venturi-like zone of the apparatus of FIG. 1.

DETAILED DESCRIPTION OF THE PREFERRED EMBODIMENTS

In general, the present process relates to the removal of sulfur dioxide from exhaust flue gases using a particulate adsorbent, preferably activated carbon, in an aqueous slurry. The system is operated continuously with a recycle of desorbed activated carbon and the recovery of sulfuric acid. For simplicity of description, the particulate adsorbent referred to herein is activated carbon although it should be understood that other adsorbents such as artificial zeolite and other forms of carbon such as coal char may be employed so long as they possess the requisite adsorption capacity. A typical adsorbent ranges in size from 8 to 50 mesh.

The present process will be described in detail in conjunction with the apparatus of the present drawing although it should be understood that other suitable apparatus may be employed. A typical exhaust flue gas may contain on the order of 2500 to 3500 ppm. sulfur dioxide at a temperature of approximately 400 to 450° F. from a source such as the combustion of sulfur-containing fossil fuel in boiler-type furnaces. Such gases are introduced into the apparatus of the present process by conduit 11 into a multi-stage flooded bed scrubber 12 including spaced stages 13 comprising supported beds of ceramic spheres or the like to assist contact. The scrubber also includes liquid outlet 14 and gas outlet 16. Suitable fluid bed scrubbers are sold under the tradename "Hydrofilter" by National Dust Collector Corporation and under the name "Turbulent Contact Adsorber" by Airotech Industries. The scrubber serves to cool the incoming gas stream, e.g., to 150° F., to improve the efficiency of adsorption on the activated carbon downstream in the process.

Liquid from outlet 14 is directed to a hydraulic classifier 17 which includes a dewatering screw 15 for the removal of dust product sludge from the system via outlet 19. The liquid fraction from the classifier serves to provide a recycled irrigation stream for scrubber 12 via a suitable scrubber recycle pump 20. If further cooling of the system is desired, a portion of the liquid removed from classifier 17 may be directed through conduit 22 into inlet conduit 11 for cooling as by spray quenching. The streams in conduits 21 and 22 are acidic in nature and serve to absorb a small portion of the sulfur dioxide in the scrubber 12.

Substantially all of the particulate matter contained in the exhaust flue gas introduced into the system through conduit 11 is removed in scrubber 12. However, if such flue gases contain an excessive amount of particulate matter, an additional solid separation stage may be employed as in the streams travelling through conduits 21 or 22 to prevent excessive built-up of solids in the recycle streams.

After treatment in scrubber 12, the cooled exhaust flue gases, partially depleted in sulfur dioxide content and substantially free of particulate matter, are conveyed through conduit 17 into a relatively low energy venturi contactor 18 of a conventional type which includes a tangential liquid slurry inlet in communication with slurry recycle conduit 22. Venturi contactor 18 includes a frusto-conical pipe inlet 23 defining an opening 24 of reduced diameter. Pipe 23 is concentrically disposed in the conduit inlet portion 26 of conduit 27. Inlet portion 26 is of substantially enlarged diameter in comparison to opening 24.

The venturi contactor 18 serves to accelerate the velocity of the entering mixture to a sufficient extent to break up the liquid portion of the slurry into fine droplets to promote intimate contact between the activated carbon and the exhaust gas. For sufficient acceleration, the reduction in diameter between opening 24 and the entering exhaust gas flow path in conduit 17 is at least 3:1. However, increasing this ratio to too great a level will result in unacceptable pressure drops. It is preferable that the pressure drop of the gas entering the system be no greater than 10 inches of water. For this purpose, the velocity of the gas stream traveling through the venturi is limited to no greater than 20 to 50 feet per second in comparison to a typical venturi scrubber in which velocities may approach 100 feet per second.

In venturi contactor 18, sulfur dioxide is adsorbed on the activated carbon to a sufficient extent that the exit gas from conduit 27 typically contains less than 100 ppm of sulfur dioxide.

The gas in conduit 27 is suitably directed to a final stage flooded bed scrubber 28 which includes multiple stages 29 of the general type described with respect to scrubber 12. Scrubber 28 serves to remove further sulfur dioxide, if necessary, and also entrained particulate matter such as small particles of activated carbon. Stages 29 may be irrigated by an aqueous stream supplied through conduit 30. If desired, this stream may include an oxidation catalyst such as manganese sulfate solution supplied through inlet 31 or sodium hydroxide which will react with any residual sulfur dioxide to further remove the same from the gas stream. The gas exiting from scrubber 28 in outlet 32 typically has a sulfur dioxide content of 50 ppm or less and a temperature on the order of 130° F. Typical sulfur dioxide removal may range from 90% to 98% or more in this system.

The following portion of the description will refer primarily to the procedure for desorbing the sulfur dioxide from the activated carbon in the slurry leaving the venturi contactor and the formation of sulfuric acid.

The solids content of the slurry entering the venturi contactor 18 from conduit 22 should be sufficient to provide sulfur dioxide removal to the desired extent but insufficient to obstruct the flow of gases. For this purpose, the solids content should be at least 2 to 6%, and typically 3%, to as high as 20%. The activated carbon may be loaded to about 10%-30% by weight sulfur dioxide and typically 20% by weight.

The slurry removed from venturi contactor 18 travels along with the exhaust gas into scrubber 28 and is transported through outlet 32 into suitable dewatering means 33, such as a dewatering screw or a vacuum drum filter. There, the slurry is concentrated with a removal of an aqueous portion in conduit 34. This portion may be directed by filtrate transfer pump 35 suitably through conduit 36 to provide a source of liquid for scrubber 12. Another portion of this stream may be directed in a manner set forth hereinafter.

The dewatered or concentrated activated carbon slurry leaving dewatering means 33 is then directed to oxidation vessel 37. The solids content of this material should be high enough to provide a source of sulfur dioxide on the activated carbon at a sufficient level to produce a sulfuric acid solution of sufficient concentration for resale value. For this purpose, the solids content is at least 50% and may be as high as can economically be formed as a result of dewatering, say to 60 to 75%.

Oxidation vessel 37 is supplied with oxygen from source 38 in the form of air and/or oxygen. In oxidation vessel 37, the sulfur dioxide adsorbed on the activated carbon is oxidized to sulfur trioxide and then adsorbed by the aqueous phase to form sulfuric acid. To increase the efficiency of this step, a small amount of ozone, e.g., 0.2 to 1%, may be also introduced. The oxygen is supplied to vessel 37 suitably through sparger 39 to enhance the efficiency of contact between the gas and the activated carbon particles.

The conditions of oxidation may be varied, depending upon the desired kinetics of the reaction. Thus, although atmospheric pressure and equilibrium temperature (e.g., about 140° F.) may be employed, elevated pressure and temperatures (e.g., up to 300 psig and 415° F.) may also be employed. Also, oxidation catalyst may be directly added to the vessel or entrained in some other liquid. For example, manganese sulfate introduced into conduit 30 from inlet 31 may be used in catalytic quantities in the reaction vessel since the irrigating liquid leaving scrubber 28 is also directed through outlet 32. In addition, small amounts of sodium hydroxide may be passed through line 30 which reacts with the sulfur dioxide gas in the scrubber to form sodium sulfate, another effective oxidation catalyst.

The concentration of the sulfuric acid produced in oxidation vessel 37 may be as high as 20 to 35% or more. If desired, this concentration may be diluted to a desired extent by introduction of liquid from conduit 36 by suitable connecting line 40.

Typical reaction time in vessel 37 is on the order of one hour to ensure adequate reaction. This is to be compared to the relatively short residence time of the gas in the scrubbers, on the order of 1 to 2 seconds, and to the extremely short time of contact between the gas and slurry in venturi contactor 18, on the order of one second or less. Thus, it is essential to removal of the sulfur dioxide from the activated carbon to a sufficient extent for recycle that this oxidation step be accomplished in a vessel separate from the venturi contactor to accomodate the enormously different required residence time.

After suitable residence time, the slurry of desorbed activated carbon and sulfuric acid is removed from oxidation vessel 37 and transferred by conduit 41 to a dewatering means 42, typically a dewatering screw or vacuum fulter, to separate the activated carbon from the acid. The activated carbon slurry stream containing on the order of 70% or more solids, is then directed to a slurry agitation tank 43 and mixed with liquid removed from dewatering means 33 through conduits 34 and 44 to dilute the slurry to a sufficient extent for ease of handling. The slurry from tank 43 is then recycled by pump 44 via conduit 22 to venturi contactor 18 to provide a source of slurry for continuous removal of sulfur dioxide from the exhaust flue gases therein.

The sulfuric acid product from dewatering means 42 is directed through outlet conduit 45 to a suitable point of usage or for further concentration by conventional means. Alternatively, if circumstances prevent use or utilization of the acid product, it can be readily disposed of, as by neutralization by pumping through lime rock beds where in situ disposal can be readily accomplished.

An example of the operation of the above system is as follows. 300,000 acfm of exhaust gases containing 3500 ppm of sulfur dioxide at 450° F. is supplied from a suitable source into conduit 11 and directed into scrubber 12. The volume of gas leaving the scrubber is 235,000 acfm, at 137° F. This gas is then directed through venturi contactor 18 wherein the sulfur dioxide content is lowered to a value on the order of 100 ppm or less and directed through conduit 27 through scrubber 28. Then, the gas is vented to the atmosphere either by pressure supplied from the initial source or drawn by an induced draft fan. The volume of this gas is on the order of 225,000 acfm at 130° F. and it includes about 50 ppm of sulfur dioxide.

Referring to the liquid portion of the above system, water is supplied to scrubber 12 at the rate of 2500 gallons per minute (gpm) with suitable make-up liquid on the order of 100 gpm supplied through line 36. The carbon slurry leaves agitator tank 43 at 2580 gpm with 3% activated carbon by weight. The make-up water stream supplied through conduit 30 of the order of 100 gpm. The slurry leaves scrubber 28 via outlet 32 at a rate of 2700 gpm. The dewatered carbon stream supplied to oxidation vessel 37 includes about 60% solids and a total of about 665 pounds of carbon per minute. The rate of liquid removal from the oxidation vessel is on the order of 83 gpm with 52 gpm of 20% sulfuric acid removed in conduit 45. The dewatered slurry fed to agitator tank 43 from dewatering means 42 includes 70% solids (665 pounds carbon per minute). The remainder of the liquid to dilute the slurry, 2500 gpm, is supplied via line 39.

It should be understood that the foregoing example is a suitable material balance for carrying out the procedure of the present invention and is not intended to limit the scope of the disclosed invention.

It is apparent from the foregoing that an efficient process has been described for the removal of sulfur dioxide from exhaust flue gases using a closed system of recycled carbon slurry. A by-product of the system is a saleable sulfuric acid product. This system includes a highly efficient slurry gas contact zone which does not produce excessive pressure drops. Also, it avoids the scaling problems of sulfuric dioxide scrubbing systems presently in operation.

We claim:

1. A method for removing sulfur dioxide from exhaust gas containing the same, comprising the steps of
   (a) conveying the exhaust gas and an aqueous slurry of particulate adsorbent for sulfur dioxide selected from the group consisting of natural or artificial zeolite activated carbon and coal char in the same general direction through a slurry contacting zone comprising a venturi contact zone of substantially reduced diameter in comparison to the exhaust gas flow path and accelerating the velocity of the entering mixture to a sufficient extent to break up the liquid portion of the slurry into fine droplets to promote intimate contact between the adsorbent and exhaust gas to remove sulfur dioxide from the exhaust gas by adsorption onto the adsorbent,
   (b) reforming a slurry from the adsorbent and liquid droplets from step (a) and conveying the same to an oxidation zone, contacting the sulfur dioxide adsorbed adsorbent therein with oxygen for sufficient time to convert the adsorbed sulfur dioxide to sulfur trioxide, and desorbing the sulfur trioxide from the adsorbent in the oxidation zone by reaction with the slurry water to form a sulfuric acid solution, and
   (c) separating at least some of the formed sulfuric acid solution from the slurry of step (b) and recycling desorbed adsorbent slurry to said contacting zone.

2. The method of claim 1 in which the adsorbent is activated carbon.

3. The method of claim 1 wherein the exhaust gas contains particulate matter including the step of removing the major portion of said particulate matter from the exhaust gas in a particle removal zone prior to conveying the same to the contact zone.

4. The method of claim 3 in which the exhaust gas is passed through a particle removal zone comprising a first packed flooded bed scrubbing tower supplied with aqueous solution.

5. The method of claim 4 in which the aqueous solution is maintained at a temperature sufficiently below that of the exhaust gas to cool the gas.

6. The method of claim 5 in which the temperature of the gas exiting the particle removal zone is no greater than 185° F.

7. The method of claim 1 in which after step (a), the exhaust gas is passed through an aqueous solution for further purification.

8. The method of claim 7 in which the exhaust gas is purified by passing the same through the aqueous solution in a second packed flooded bed scrubber.

9. The method of claim 1 in which the reduction in diameter in the venturi contact zone is at least 3:1.

10. The method of claim 1 in which the pressure drop in the venturi contact zone is no greater than about 10 inches of water.

11. The method of claim 1 in which the slurry fed to the oxidation zone includes a solids content of about 50 to 80% by weight.

12. The method of claim 11 in which between steps (a) and (b) the slurry is concentrated by removal of a portion of the aqueous content.

13. The method of claim 1 in which a sulfur dioxide oxidation catalyst is present in the oxidation zone.

14. The method of claim 13 in which the catalyst is selected from the group consisting of manganese sulfate, sodium sulfate and mixtures thereof.

15. The method of claim 1 in which ozone is supplied to the oxidation zone during step (b).

16. The method of claim 1 in which the sulfuric acid content of the aqueous phase in the oxidation zone is at least 10% by weight.

* * * * *